United States Patent [19]

Guiselin

[11] Patent Number: 5,595,825
[45] Date of Patent: Jan. 21, 1997

[54] TRANSPARENT SUBSTRATE PROVIDED WITH A STACK OF THIN FILMS ACTING ON SOLAR AND/OR INFRARED RADIATION

[75] Inventor: Olivier Guiselin, Paris, France

[73] Assignee: Saint-Gobain Vitrage, Courbevoie, France

[21] Appl. No.: 309,652

[22] Filed: Sep. 21, 1994

[30] Foreign Application Priority Data

Sep. 23, 1993 [FR] France ................. 93 11339

[51] Int. Cl.$^6$ .................. B32B 17/06
[52] U.S. Cl. .......... 428/428; 428/216; 428/432; 428/433; 428/434; 428/469; 428/472; 428/699; 428/701; 428/702; 428/913; 359/360; 359/585; 359/589
[58] Field of Search ................. 428/432, 433, 428/434, 469, 472, 216, 428, 698, 699, 701, 702, 913; 359/360, 585, 589

[56] References Cited

U.S. PATENT DOCUMENTS

| | | | |
|---|---|---|---|
| 5,071,206 | 12/1991 | Hood et al. | 359/360 |
| 5,201,926 | 4/1993 | Szczyrobowski et al. | 65/60.2 |
| 5,337,191 | 8/1994 | Austin | 359/360 |

FOREIGN PATENT DOCUMENTS

| | | |
|---|---|---|
| 0332717 | 9/1989 | European Pat. Off. . |
| 0456487 | 11/1991 | European Pat. Off. . |
| 2669325 | 5/1992 | France . |
| 2027925 | 2/1980 | United Kingdom . |
| WO-A-9002653 | 5/1990 | WIPO . |
| WO-A-9005439 | 5/1990 | WIPO . |

*Primary Examiner*—Ellis Robinson
*Assistant Examiner*—Timothy M. Speer
*Attorney, Agent, or Firm*—Oblon, Spivak, McClelland, Maier & Neustadt, P.C.

[57] ABSTRACT

A transparent substrate (i), particularly glass, having a stack of thin films comprising successively form the substrate:
  i) a first dielectric material film;
  ii) a first film having infrared reflection properties;
  iii) a second dielectric material film;
  iv) a second film having infrared reflection properties;
  v) a third dielectric material film;
  vi) a third film having infrared reflection properties; and
  vii) a fourth dielectric material film, wherein the thickness of said third film having infrared reflection properties (vi) is greater than the thickness of said second film having infrared reflection properties (iv) and the thickness of said second film having infrared reflection properties (iv) is greater than the thickness of said first film having infrared reflection properties (ii).

24 Claims, 1 Drawing Sheet

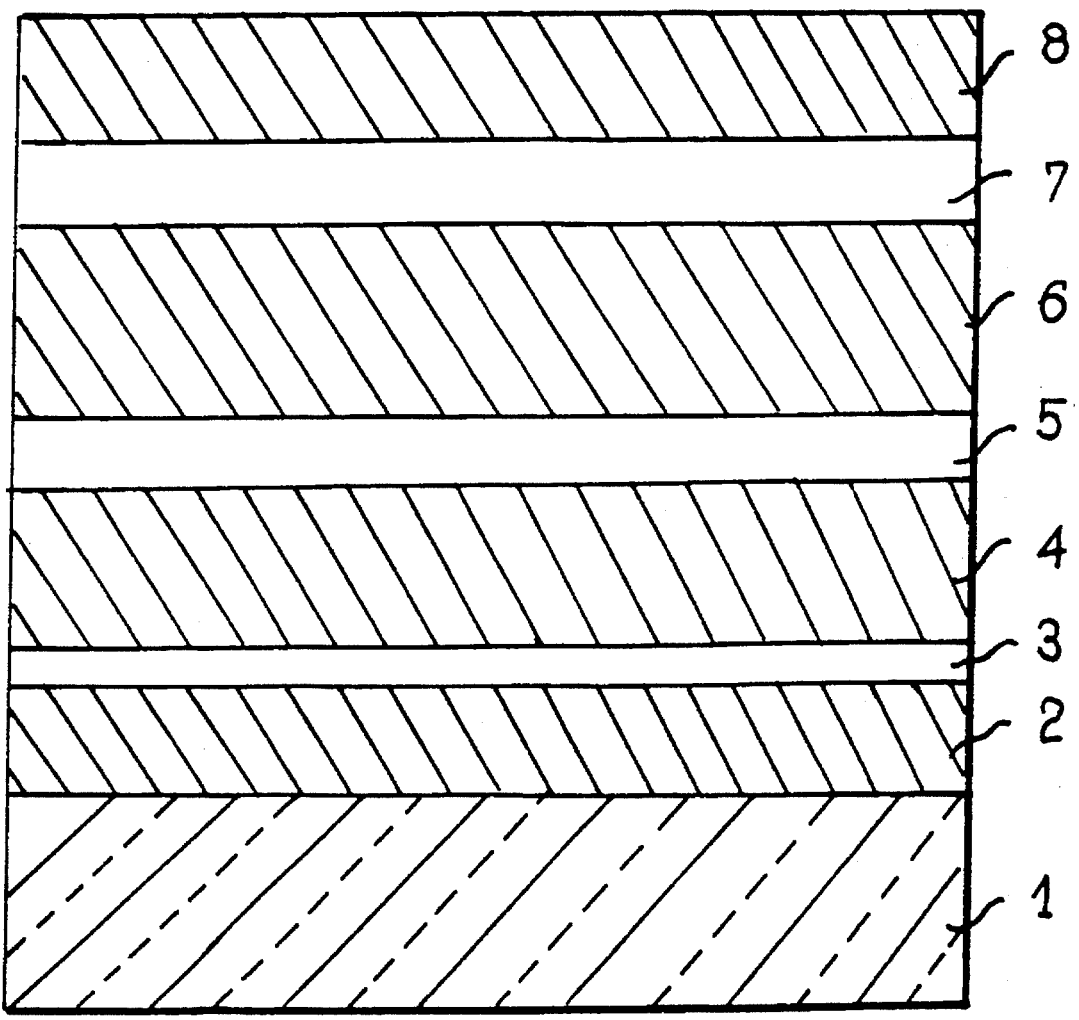
FIG_1

TRANSPARENT SUBSTRATE PROVIDED WITH A STACK OF THIN FILMS ACTING ON SOLAR AND/OR INFRARED RADIATION

BACKGROUND OF THE INVENTION

1. Field of the Invention

The present invention relates to substrates coated with a stack of films including at least one film which reflects solar and/or infrared radiation.

The present invention also relates to the use of coated substrates for the production of panes specially adapted for thermal insulation and/or solar protection. These panes can be fitted into buildings, ships, and automobiles to reduce the amount of energy required to air condition the same.

2. Discussion of the Background

Stacks of thin films have previously been used to reflect solar and/or infrared radiation. Such films consist of one or more metallic films, such as silver films, alternating with films of dielectric material, such as metallic oxide films. These stacks are generally produced by successively depositing films onto the surface of a substrate using the cathodic sputtering technique under vacuum in a magnetic field.

Increasing the number of metal film layers in the stack enables the solar protection to be optimized, which in turn results in a reduction of the solar factor (SF) of the pane (the solar factor of a pane is the ratio of the total energy entering a room through the pane and the incident solar energy). However, increased metal film layers leads to a reduction in the transparency of the pane, which manifests itself in a decrease in the value of the light transmission $T_L$ of the pane.

U.S. Pat. No. 5,071,206 relates to a substrate on which is deposited a stack of layers made of three silver-based films alternating with four films of metallic oxide, such as indium oxide. The three silver films are substantially of equal thicknesses however, although the central silver film is slightly thicker than the other two. Unless such a substrate is incorporated into a laminated pane with the face of the substrate which has been coated with the film stack placed in contact with a thermoplastic intermediate film of, e.g., polyvinyl butyral (PVB), the reflective appearance of the substrate is not aesthetically pleasing. Instead, the substrate appears intensely reddish in reflection; a color that is not popular, especially with architects.

Clearly there exists a need for a stacked, thin film coated substrate having both high antisolar performance and high transparency, not forgetting the industrial feasibility of providing such a stack.

SUMMARY OF THE INVENTION

Accordingly, one object of this invention is to provide a substrate coated with a film stack comprising at least three films having reflection properties in the infrared (IR) portion of the spectrum and which has high selectivity, i.e., a high $T_L/SF$ ratio for a given value of $T_L$, which provides an appearance and an external reflection which is pleasing to the eye.

A second object of the present invention is to incorporate the above film stack-coated substrate into a monolithic pane, a multiple insulating pane of the double glazing type, a laminated pane, etc.

The present inventors have now discovered that these objects can be achieved with a transparent substrate, preferably glass, coated with a stack of thin films comprising, successively and starting from the substrate, a first dielectric material film, a first film having infrared reflection properties, a second dielectric material film, a second film having infrared reflection properties, a third dielectric material film, a third film having infrared reflection properties, and finally a fourth dielectric material film, wherein the three films having infrared reflection properties are arranged such that the thickness of the third IR reflective film is greater than that of the second IR reflective film, and the thickness of the second IR reflective film is greater than that of the first IR reflective film.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawing, wherein:

FIG. 1 shows a transparent substrate according to the present invention, where the relative thicknesses of the layers are not drawn to scale.

DETAILED DESCRIPTION OF THE PREFERRED EMBODIMENTS

The present invention provides a substrate, preferably transparent and preferably glass, coated with a stack of thin films comprising, successively (starting from the substrate), a first dielectric material film, a first film having infrared reflection properties (preferably a metallic film) a second dielectric material film, a second film having infrared reflection properties (preferably a metallic film) a third dielectric material film, a third film having infrared reflection properties (preferably a metallic film) and finally a fourth dielectric material film, wherein the thicknesses of the three films having infrared reflection properties are chosen in such a way that the thickness of the third IR reflective film is greater than that of the second IR reflective film, and the second IR reflective film is thicker than the first IR reflective film.

The films having infrared reflection properties are preferably metal films, more preferably based upon silver, most preferably completely silver. Other IR reflective films include those based on gold, copper, alloys of at least two of silver, gold and copper, etc. Substantially pure films of these IR reflective materials are preferred. Different IR reflective films can be used in the invention stack of films, or all three IR reflective films can be of the same material.

The dielectric material films may each be a metal sulphide, preferably zinc sulphide (ZnS), or a metallic oxide, preferably tantalum oxide, zinc oxide, tin oxide, or a mixture of at least two of these oxides. Since ZnS may be deposited as a thin film by evaporation under vacuum, it is possible to deposit all of the films of the stack either by evaporation or by cathodic sputtering. With regard to a suitable substrate material, it is preferable to use a conventional transparent or translucent glass substrate such as those used in optical applications, particularly automotive window glass or building window glass.

Each of the oxides used for the dielectric material film have certain advantages. Tin oxide or zinc oxide may be deposited at high speeds when a reactive cathodic sputtering technique is used, which is industrially of great interest. In contrast, tantalum oxide enables increased durability against mechanical or chemical attack to be obtained. As with the IR reflective films, there is no obligation to choose the same material for all the dielectric material films in the invention film stack. Thus, the first two or three films may be of tin oxide, in order to increase production rates, and the last film may be of tantalum oxide to protect the stack of thin films as effectively as possible. Furthermore, not having all four films of dielectric material made of the same oxide enables certain photometric values of the stack to be advantageously adjusted preferably the value of $T_L$ and/or the solar factor SF. The colorimetry can also be modified.

The asymmetry in the thicknesses of the three films having infrared reflection properties is preferably adjusted in such a way that the ratio of the thicknesses of the third IR film to the second IR film, and the ratio of the thicknesses of the second IR film to that of the first IR film, are each independently between 1.40 and 1.05, more preferably between 1.30 and 1.10.

The fact that the films having infrared reflection properties increase in thickness the further they are from the substrate enables panes having very high selectivity to be obtained, i.e., panes having a $T_L$/SF ratio of at least 1.8, preferably of at least 2. By modulating the thicknesses of the films, one can control the transparency of the pane and to obtain values of $T_L$ on the order of 58, 59, 60, 61, 62, 63, 64, 65, 66, 67 and 68%, a range especially suitable for panes intended for buildings. Likewise, solar factors SF on the order of 28, 29, 30, 31, 32, 33, 34, 35 and 36%, are achieved.

A major advantage of the present invention is that good performance in terms of solar protection is not achieved at the expense of the visual appearance of the substrate. In fact, whether it is used as a monolithic pane or incorporated into a multiple pane of the double glazing type, a transparent substrate coated with a stack of thin films according to the present invention has a coloration in its external reflection that is pleasing and soft, i.e., in the range of the blues or blue-greens (colors having dominant wavelengths on the order of from 470 to 500 nanometers). In addition, this coloration appears neutral, washed with white and non-brilliant, which is shown by the purity in reflection being less than 6% and the external reflection $R_L$ being less than 10%.

Moreover, the visual appearance of the present invention film stack-coated substrate remains virtually unchanged whatever the angle of incidence from which the pane is observed. This means that an external observer viewing a facade of a building equipped with such panes does not get the impression of a significant inhomogeneity in tint or appearance, which is an effect very much sought after by architects.

It should be noted that, in internal reflection, the invention stack-coated substrates mounted as panes also have a color in the blues or in the blue-greens, neutral and non-brilliant. This means that when it is dark outside a person inside an illuminated room equipped with such panes sees these panes colored in a pleasant manner.

The colorimetry of the stack-coated substrates according to the present invention can be further improved if the thickness of the three films having infrared reflection properties increases progressively and uniformly, i.e., the ratio of the thickness of the third film to that of the second film and the ratio of the thickness of the second film to that of the first film are about equal. The term "about equal" as used with regard to two ratios means a variation of 10% preferably 5%, more preferably 2.5%, most preferably 1% based on the larger ratio. These ratios are each preferably chosen to be about 1.15 to 1.13. "About" have means ±%5.

According to a preferred embodiment of the present invention, the first film having infrared reflection properties is provided with a thickness of from 8 to 12 nanometers, preferably 9.5, the second film having infrared reflection properties is provided with a thickness of 10 to 13 nanometers, preferably 11, and finally the third film having infrared reflection properties is provided with a thickness of approximately 11 to 15 nanometers, preferably 12.5.

The thicknesses of the four films of dielectric material will now be described. It is preferable for the thickness of the fourth dielectric material film to be equal to or slightly greater than that of the first, i.e., a ratio of between 1 and 1.20. Similarly, the thicknesses of the "intermediate" films of dielectric materials, i.e., the second and third films, are preferably chosen to be close to one another and are preferably in a thickness ratio (second film/third film) of between 0.9 and 1.1. These films are, in addition, preferably thicker than the first and fourth films.

Advantageously, the thickness of each of the second and third dielectric material films is chosen to be greater than or equal to the sum S of the thicknesses of the first and fourth films, each preferably having a thickness of from S ×1.1 to S ×1.2. In a preferred embodiment the thickness of the first dielectric film is between 27 and 34 nanometers, and preferably equal to approximately 29 or 32 nanometers. The thickness of the second and of the third dielectric films are between 70 and 80 nanometers, preferably equal to 72, 73, 74, 75, 76 or 77 nanometers. The thickness of the fourth dielectric film is between 32 and 37 nanometers and may be preferably 34, 35 or 36 nanometers.

It should be noted, furthermore, that it is preferable to cover each of the films having infrared reflection properties, especially if they are made of metal, with a fine metallic barrier film of a metal other than silver, such as a nickel-chrome alloy, tantalum or titanium, particularly when the films of dielectric material are deposited by reactive cathodic sputtering in the presence of oxygen. These barrier films protect the underlying films, particularly metal films, from contact with the oxygen by partially oxidizing themselves.

In preparing the invention stacked film substrate it is also possible to deposit some or all films having infrared reflection properties onto a fine bonding film which improves the adhesion of the film having infrared reflection properties to the underlying dielectric material film. The bonding films are preferably of the same nature as the barrier films referred to above, i.e., they are made of a metal other than silver and may, for example, be based upon alloys of the nickel-chrome type or based upon tantalum or titanium. The presence of the barrier and/or bonding films enable the invention stack of thin films as a whole to more effectively resist later thermal treatments which the carrying substrate may have to undergo, i.e., annealing, bending or toughening. Preferable thicknesses of the bonding and barrier films range from 0.5 to 4 nm, preferably 1 to 3 nm.

Other features of the invention will become apparent in the course of the following descriptions of exemplary embodiments which are given for illustration of the invention and are not intended to be limiting thereof.

EXAMPLES

In the examples that follow, the successive film depositions are performed by magnetic field assisted cathodic sputtering, but any other deposition technique which provides control of the thicknesses of the films to be deposited may be used. In the examples the substrates upon which the stacks of thin films are deposited are silico-sodo-calcic glass substrates of 4 millimeter thickness. Any other substrate can be used including plastic substrates, particularly those made of polymethylmethacrylate, etc. Glass substrates are preferred. Transparent and translucent substrates are preferred. Particularly preferred are clear or colored (with appropriate coloring oxides such as iron or cobalt oxides) transparent and translucent glass substrates including the TSA and TSA2+substrates made by Saint-Gobain. They are afterwards assembled, to form a double glazing pane, with an identical but bare substrate by means of a layer of gas of 10 millimeter thickness.

FIG. 1 shows a transparent substrate coated with a stack of thin films according to the present invention and, in the interest of clarity, is not to scale with regard to the thicknesses of the films. There can be seen here the substrate 1, the three films 3, 5, and 7 having infrared reflection properties and the four dielectric material films 2, 4, 6, and 8. Not shown here are the optional fine barrier films covering each of the silver films 3, 5, and 7 or the optional bonding films.

The deposition installation comprises at least one sputtering chamber provided with cathodes equipped with targets of suitable materials, beneath which the substrate 1 passes in succession. These conditions of deposition for each of the films are as follows:

a) The films 3, 5, 7 are based upon silver and are deposited by means of a silver target, under a pressure of 0.8 Pa in an argon atmosphere, b) The films 2, 4, 6 or 8, when they are based upon $SnO_2$, are deposited by reactive sputtering by means of a tin target, under a pressure of 0.8 Pa and in an argon/oxygen atmosphere containing 36% by volume oxygen, c) The films 2, 4, 6 or 8, when they are based upon $Ta_2O_5$, are deposited by reactive sputtering by means of a tantalum target, under a pressure of 0.8 Pa and in an argon/oxygen atmosphere containing approximately 10% by volume oxygen, d) The three optional barrier films based of Ni—Cr are deposited by means of a target of nickel-chrome alloy in an argon atmosphere.

The power densities and the speeds of travel of the substrate 1 are adjusted in known manner in order to obtain the desired film thicknesses.

Example 1 relates a stack of films wherein the four dielectric material films are tin oxide, whereas Example 2 concerns a stack in which the four dielectric material films are tantalum oxide. It is to be emphasized, however that the dielectric material films and IR reflective films can be made of different materials within a single stack of films. The barrier and bonding films can also vary in material within a single stack.

Table 1 below gives the thicknesses in nanometers of the films of the two stacks prepared:

TABLE 1

|  | Example 1 | Example 2 |
| --- | --- | --- |
| $Ta_2O_5$ or $SnO_2$ (2) | 32 | 29 |
| Ag (3) | 9.5 | 9.5 |
| Ni—Cr | 2 | 2 |
| $Ta_2O_5$ or $SnO_2$ (4) | 77 | 73 |
| Ag (5) | 11 | 11 |
| Ni—Cr | 2 | 2 |
| $Ta_2O_5$ or $SnO_2$ (6) | 77 | 72 |
| Ag (7) | 12.5 | 12.5 |
| Ni—Cr | 2 | 2 |
| $Ta_2O_5$ or $SnO_2$ (8) | 35 | 34 |

Table 2 below indicates, for each of the two examples, the light transmission value $T_L$ in percent, the solar factor SF calculated according to standard DIN 67 507 (Annexe A 233) in percent, the external and internal light reflection values $R_L$-ext and $R_L$-int in percent, and also the dominant wavelengths in nanometers, Lambda-int and Lambda-ext, and the purities in percent p-ext and p-int which are associated therewith (values measured on the substrate mounted in double glazing and with reference to illuminant $D_{65}$).

TABLE 2

|  | Example 1 | Example 2 |
| --- | --- | --- |
| T | 59 | 62 |
| SF | 30 | 34 |
| $R_L$-ext | 8.9 | 9.8 |
| Lambda-ext | 499 | 485 |
| p-ext | 1 | 6 |
| $R_L$-int | 10.8 | 10.7 |
| Lanbda-int | 501 | 475 |
| p-int | 1 | 3 |

Panes according to the present invention have a high $T_L$/SF ratio, and therefore provide good solar protection within a range of light transmissions especially adapted for installation into buildings. Moreover, the tints in internal and external reflection remain within the range of the blue-greens, colors that are appreciated from the aesthetic standpoint. These colors are very neutral because they possess parities at worst of 6% and reflection values that remain below or close to 10%. In addition, these panes do not suffer from any modification to their appearance in reflection that can be perceived, if the angle from which they are observed varies.

This application is based on French Patent Application FR-93/11339 filed on Sep. 23, 1993, which is incorporated herein in its entirety by reference.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patents of the United States is:

1. A laminate having an external light reflection of blue or blue-green with a dominant wavelength in the range of from about 470 to 500 nm, said external light reflection remaining substantially constant in said range irrespective of viewing angle, which comprises a first transparent substrate and a plurality of thin films deposited thereon, said plurality of thin films comprising successively from the substrate:

i) a first dielectric material film;

ii) a first film having infrared reflection properties;

iii) a second dielectric material film;

iv) a second film having infrared reflection properties;

v) a third dielectric material film;

vi) a third film having infrared reflection properties; and vii) a fourth dielectric material film, wherein the thickness of said third film having infrared reflection properties (vi) is greater than the thickness of said second film having infrared reflection properties (iv), and wherein the thickness of said second film having infrared reflection properties (iv) is greater than the thickness of said first film having infrared reflection properties (ii).

2. The laminate according to claim 1, wherein the ratio of the thickness of said third film having infrared reflection properties (vi) to the thickness of said second film having infrared reflection properties (iv) and the ratio of the thickness of said second film having infrared reflection properties (iv) to the thickness of said first film having infrared reflection properties (ii) are between 1.40 and 1.05.

3. The laminate according to claim 2, wherein said ratios are between 1.30 and 1.10.

4. The laminate according to claim 1, wherein the ratios of the thickness of said third film having infrared reflection properties (vi) to the thickness of said second film having infrared reflection properties (iv) and the ratio of the thickness of said second film having infrared reflection properties (iv) to the thickness of said first film having infrared reflection properties (ii) are about equal.

5. The laminate according to claim 4, wherein said ratios are from about 1.13 to about 1.15.

6. The laminate according to claim 1, wherein the thickness of said first film having infrared reflection properties (ii) is about 8 to 12 nanometers.

7. The laminate according to claim 6, wherein said thickness of said first film having infrared reflection properties (ii) is 9.5 nanometers.

8. The laminate according to claim 1, wherein the thickness of said second film having infrared reflection properties (iv) is about 10 to 13 nanometers.

9. The laminate according to claim 8, wherein said thickness of said second film having infrared reflection properties (iv) is 11 nanometers.

10. The laminate according to claim 1, wherein the thickness of said third film having infrared reflection properties (vi) is about 11 to 15 nanometers.

11. The laminate according to claim 10, wherein said thickness of said third film having infrared reflection properties (vi) is 12.5 nanometers.

12. The laminate according to claim 1, wherein the ratio of the thickness of fourth dielectric material film (vii) of the thickness of said first dielectric material film (i) is between 1 and 1.20.

13. The laminate according to claim 1, wherein the ratio of the thickness of said third dielectric material film (v) to the thickness of said second dielectric material film (iii) is between 0.9 and 1.1.

14. The laminate according to claim 1, wherein the thicknesses of said second (iii) and said third (v) dielectric material films are each greater than or equal to a sum S of the thicknesses of said first (ii) and fourth (vii) dielectric material films.

15. The laminate according to claim 14, wherein said thicknesses of said second (iii) and said third (v) dielectric material films are each between the product S×1.1 and the product S ×1.2.

16. The laminate according to claim 1, wherein the thickness of said first dielectric material film (i) is from 27 to 34 nanometers, the thicknesses of said second dielectric material film (iii) and said third dielectric material film (v) are each from 70 to 80 nanometers, and the thickness of said fourth dielectric material film (vii) is from 32 to 37 nanometers.

17. The laminate according to claim 1, wherein said films (ii), (iv), and (vi) having infrared reflection properties are metallic films.

18. The laminate according to claim 17, wherein said metallic films are silver.

19. The laminate according to claim 1, wherein said dielectric material films (i), (iii), (v), and (vii) are each either a metallic sulfide, or a metallic oxide selected from the group consisting of tin oxide, tantalum oxide, zinc oxide, and mixtures thereof.

20. The laminate according to of claim 19, wherein said metallic sulphide is zinc sulphide.

21. The laminate according to claim 1, wherein each of said films having infrared reflection properties is covered with a partially oxidized metallic barrier film.

22. The laminate according to claim 21, wherein said barrier film is based upon a component selected from the group consisting of nickel-chrome alloy, tantalum and titanium.

23. The laminate according to claim 1, wherein each of said films having infrared reflection properties is disposed on a metallic bonding film.

24. The laminate according to claim 23, wherein said metallic bonding film is based upon a component selected from the group consisting of nickel-chrome alloy, tantalum and titanium.

* * * * *